US00RE36414E

United States Patent [19]

Tickner

[11] E Patent Number: Re. 36,414

[45] Reissued Date of Patent: Nov. 30, 1999

[54] LIGHTING APPARATUS

[75] Inventor: Jerold A. Tickner, Phoenix, Ariz.

[73] Assignee: Sportlite, Inc., Phoenix, Ariz.

[21] Appl. No.: 08/607,000

[22] Filed: Feb. 26, 1996

Related U.S. Patent Documents

Reissue of:

[64] Patent No.: 5,377,086
Issued: Dec. 27, 1994
Appl. No.: 08/036,822
Filed: Mar. 25, 1993

U.S. Applications:

[63] Continuation-in-part of application No. 07/863,094, Apr. 3, 1992, Pat. No. 5,197,798.

[51] Int. Cl.[6] ..... F21S 5/00

[52] U.S. Cl. ..... 362/235; 362/225; 362/260; 362/297; 362/404

[58] Field of Search ..... 362/235, 225, 362/260, 297, 404, 216, 246, 353, 360, 361, 251, 226, 405, 221

[56] References Cited

U.S. PATENT DOCUMENTS

| | | | |
|---|---|---|---|
| 862,397 | 8/1907 | Hruska . | |
| 1,160,859 | 11/1915 | Dale . | |
| 1,257,496 | 2/1918 | Lamb . | |
| 1,484,978 | 2/1924 | Wheeler . | |
| 1,654,243 | 12/1927 | Eckschlager . | |
| 1,927,897 | 9/1933 | Moser | 240/81 |
| 2,093,165 | 9/1937 | Flood | 240/78 |
| 2,194,431 | 3/1940 | O'Neil | 240/103 |
| 2,408,669 | 10/1946 | Mattson | 240/123 |
| 3,643,088 | 2/1972 | Osteen et al. | 240/52 |
| 3,735,329 | 5/1973 | Funabashi et al. | 339/89 R |
| 4,347,460 | 8/1982 | Latassa et al. | 315/63 |
| 4,367,417 | 1/1983 | Casasanta | 307/147 |
| 4,520,436 | 5/1985 | McNair et al. | 362/366 |
| 4,595,969 | 6/1986 | McNair | 362/217 |
| 4,704,664 | 11/1987 | McNair | 362/225 |
| 4,802,073 | 1/1989 | Plumly | 362/251 |
| 4,922,393 | 5/1990 | McNair | 362/225 |
| 5,197,798 | 3/1993 | Tickner | 362/235 |

FOREIGN PATENT DOCUMENTS

| | | |
|---|---|---|
| 101574 | 11/1925 | Austria . |
| 193493 | 11/1957 | Austria . |
| 1085180 | 1/1955 | France . |
| 710827 | 8/1941 | Germany . |
| 943603 | 5/1956 | Germany . |
| 945777 | 7/1956 | Germany . |
| 4075204 | 3/1992 | Japan . |
| 878534 | 10/1961 | United Kingdom . |

OTHER PUBLICATIONS

Letter dated Dec. 6, 1995 to Steven G. Lisa from Norman E. Lehrer, marked in re: Intrepid v. Sportlite, Inc. Our File No. S5038.

Letter dated Dec. 12, 1995 to Steven G. Lisa from Norman E. Lehrer, marked In re: Intrepid Lighting v. Sportlite, Inc. Our File No. S5038.

*Primary Examiner*—Stephen Husar
*Attorney, Agent, or Firm*—Steven G. Lisa; William J. Hallihan

[57] ABSTRACT

A lighting system employs luminaires having reflectors with a fluorescent lamp support frame at the base end of the inside of the reflector. The support frame includes a plurality of extensions for holding the bases of compact fluorescent lamps arranged in a general star configuration around the center line of the reflector. The extensions are at an angle to cause the compact fluorescent lamps to follow the outwardly-flared inside surface of the reflector. A system of luminaires then provides a substantially uniform volume of light in a facility due to the patterns of overlapping light contributed by the individual luminaires.

44 Claims, 5 Drawing Sheets

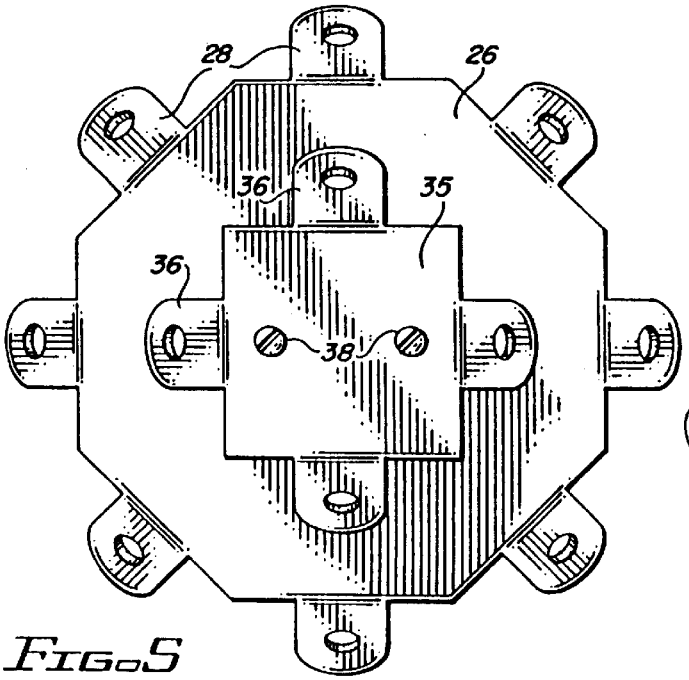
FIG. 5
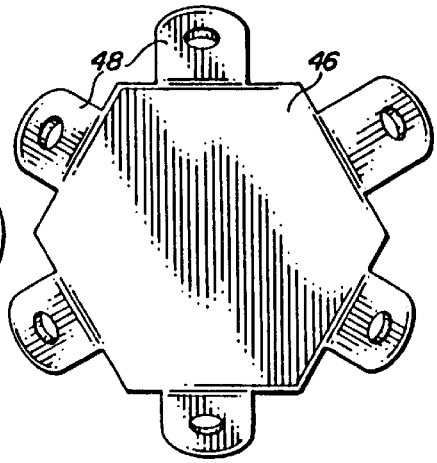
FIG. 6
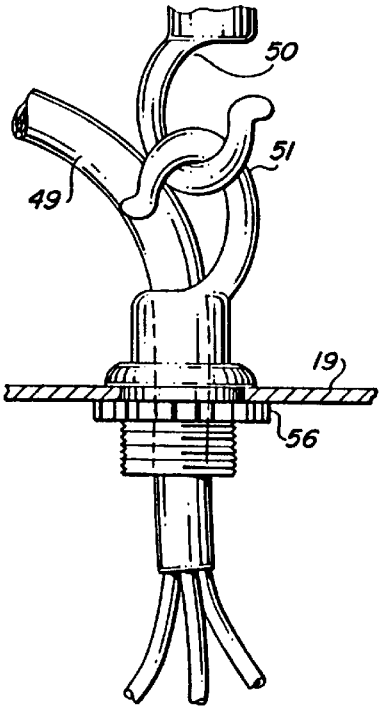
FIG. 8
FIG. 7
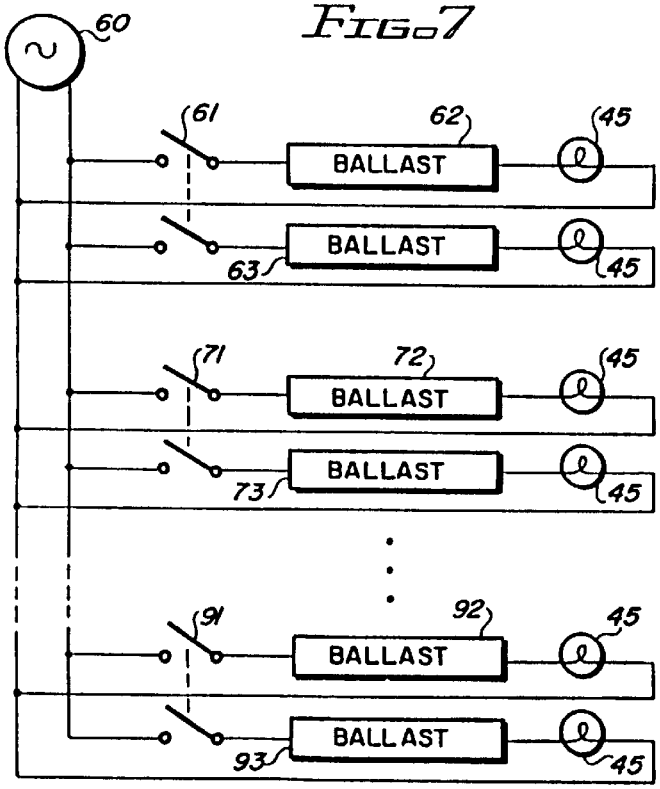

LIGHTING APPARATUS

Matter enclosed in heavy brackets [ ] appears in the original patent but forms no part of this reissue specification; matter printed in italics indicates the additions made by reissue.

RELATED APPLICATION

This application is a continuation-in-part of copending application Ser. No. 07/863,094 filed on Apr. 3, 1992, now U.S. Pat. No. 5,197,798.

BACKGROUND

High intensity discharge (HID) lamp fixtures are widely used to provide lighting in warehouses, airplane hangars, and other commercial buildings. Typically, fixtures using such lamps use mercury vapor, metal halide, and high or low pressure sodium lamps, depending upon the particular application and the lighting characteristics desired. Such lamps generally are high wattage (500 or 1000 Watts, for example); so that in the buildings in which they are used, significant energy consumption takes place.

For the purpose of maximizing the downward light output from such high wattage lamps, flared, generally bell-shaped reflectors have been designed to fit over the base of the bulb, which then is screwed into the power supply outlet for the lamp. The lamp itself, in at least some of these applications, forms the support for the reflector, which generally is made of polished aluminum or similar lightweight material. The lamp extends through the base end of the reflector; and the light-emitting end is either open or covered with a translucent lens to disperse the light emanating from the lamp, and to provide a more attractive appearance.

The coverage or area of illumination of a typical reflector for an HID lamp of this type generally is approximately 1.6 (that is, it is 1.6 times the height from the floor to the light-emitting opening of the fixture). The light typically is projected in a circle; so that the spacing of the lamp fixtures is selected in accordance with this formula to provide the desired amount of overlap, if any, needed for any particular application.

A primary problem with HID lamps, of any of the above types, is that the high wattage results in significant energy consumption, which, in turn, translates into high utility bills. Fluorescent lamp fixtures typically are low wattage fixtures; but for providing the desired levels of illumination in warehouses, airplane hangars and similar high-ceilinged buildings, a large number of fluorescent light fixtures must be employed to produce the desired lumens of light on the floor of the building in which they are used. The large number of fixtures required results in significantly increased initial installation cost over the fixtures required for HID lamps, typically spaced greater distances apart in a comparative installation. In addition, many applications indicate that standard fluorescent lamp fixtures cannot produce the necessary lumens of light at the floor or work surface of warehouses and the like.

High intensity discharge lamps of the mercury or metal halide variety utilize gas in a discharge tube, which is manufactured from quartz. Current passing through the gas generates light. The discharge tube is enclosed in an outer bulb which is formed from glass. Consequently, the light passes through both the quartz discharge tube and the glass bulb. The discharge tubes of these lamps emit a high degree of ultraviolet radiation along with the light.

Normally, this is not of any consequence, since ultraviolet radiation in the harmful ranges is absorbed by the outer glass bulb. In a sports area, however, it is possible (and has been known) for a ball or other object to hit a HID fixture, breaking the outer bulb but leaving the structurally stronger quartz arc tube intact. In such an event, the HID lamp continues to burn; and ultraviolet radiation of harmful wavelengths is emitted directly, and is likely to strike players or spectators. The results can be unpleasant and potentially dangerous in severe cases. On the other hand, the light generated by fluorescent lamps contains no significant ultraviolet radiation. Although some ultraviolet radiation is produced within the fluorescent tubes, the ultraviolet radiation is absorbed by the glass tube. If the tube is broken, the lamp immediately extinguishes, and there is no danger from the damaging effect of uncontrolled ultraviolet radiation.

Generally, commercial ceiling lamps for fluorescent light fixtures employ elongated fluorescent tubes, usually having a length of four or eight feet. These tubes then are placed in appropriate luminaires oriented parallel to the floor or ground to produce the desired illumination. Installation and replacement of fluorescent tubes, particularly eight foot tubes, is somewhat difficult simply because of the length of the tubes involved.

Compact fluorescent tubes have been designed in a generally "folded-over" configuration, which attach to a light fixture at one end. Three patents disclosing ceiling light fixtures for recessed lamp reflectors, and which use compact fluorescent tubes, are the U.S. Pat. Nos. 4,520,436; 4,704,664; and 4,922,393 to McNair. These patents disclose the use of a pair of compact fluorescent lamps, mounted in a generally crossed configuration inside a dome-shaped reflector, to produce a light output which is comparable to that of an incandescent bulb in a reflector having a similar diameter light-emitting end. The reflector, itself, is designed with openings through it, in which the bases of the lamps are mounted (on the upper outside of the reflector). Provisions also are made for attaching the ballasts for the lamps to the outside of the reflector. The reflector then is placed in a recessed housing in the ceiling to accommodate all of the lamp sockets and ballasts in a space between the reflector and the end of the housing.

In the devices shown in all of these patents, the housing itself has a threaded lamp base on it to supply operating current to the ballasts and the lamps. The conventional screw-in threaded base then may be inserted into a normal incandescent lamp socket; so that the entire housing is suspended from the socket. These fixtures are designed to replace incandescent lamps in recessed ceiling fixtures of relatively low wattage (typically replacing a 60 to 100 Watt incandescent lamp). Lower power consumption results; and the lumen output, using crossed pairs of compact fluorescent lamps, is approximately equivalent to the incandescent lamp replaced. In addition to reduced power consumption, the compact fluorescent lamps typically have a life several times greater than the life of incandescent lamps.

A different approach to a lighting apparatus is disclosed in the British patent to Schmidt No. 878,534. Schmidt is directed to a very specific three-phase lighting apparatus, where each of three lamps (which may be incandescent lamps or mercury vapor lamps) are operated from a different one of the three phases of an electrical supply. As noted in Schmidt, this causes a stroboscopic effect from each individual one of the light sources; but the overall effect from the fixture itself is one of relatively uniform light supply. The Schmidt apparatus comprises a lamp base with three fairly closely spaced sockets in it. The sockets extend outwardly at angles of approximately 45° relative to the vertical; and the lamps are clustered in the center of the fixture, spaced a substantial distance from the reflector which surrounds them.

It is desirable to provide a lighting apparatus which may be directly substituted for high-wattage HID lamp fixtures, or, alternatively, which may be directly substituted for HID lamps as a direct replacement, which provides the advantages of reduced power consumption, which is relatively inexpensive and which produces a lumen output comparable to the high-wattage HID lamps being replaced.

SUMMARY OF THE INVENTION

Accordingly, it is an object of this invention to provide an improved lighting apparatus.

It is another object of this invention to provide an improved lighting system.

It is an additional object of this invention to provide an improved compact fluorescent lighting apparatus capable of substitution for HID lamp apparatus.

It is a further object of this invention to provide an improved lighting apparatus using compact fluorescent lamps arranged in a multiple-lamp array within a reflector for producing improved coverage and reduced energy consumption.

It is yet another object of this invention to provide a multiple-lamp array of fluorescent lamps with selective operation of the lamps for effective stepped dimming of the light from the array.

In accordance with a preferred embodiment of the invention, a lighting fixture includes a reflector which has a base end and a larger light-emitting end. The reflector is of a symmetrical shape about a line extending from the center of the base end to the center of the light-emitting end. A lamp support member is located within the reflector at the base end, and it supports a plurality of compact fluorescent lamps within the reflector between the base and the light-emitting end. Electric power is supplied to the lamps located within the reflector on the lamp support member. In a more specific embodiment of the invention, several lighting fixtures are arranged in a uniform array at a predetermined distance above a surface to be illuminated. Light from the fixtures has considerable overlap to produce illumination of substantial uniformity.

BRIEF DESCRIPTION OF THE DRAWINGS

FIG. 5 is an end view of the portion shown in FIG. 4;

FIG. 6 is an alternative end view of a variation of the structure shown in FIG. 4;

FIG. 7 is a schematic diagram of an electrical operating circuit for the embodiment shown in FIGS. 2 through 5;

FIG. 8 is a detail of an alternative to the portion of the embodiment shown in FIG. 2;

DETAILED DESCRIPTION

Figure 1:
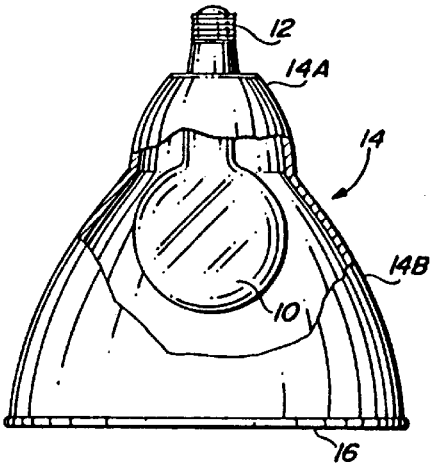
FIG. 1 (PRIOR ART)
FIG. 1 is a partially cut-away view of a lamp fixture of the prior art.

Reference now should be made to the drawing, in which the same reference numbers are made throughout the different figures to designate the same or similar components. FIG. 1 is a partially cut-away illustration of a typical prior art HID lamp fixture of the type widely used in large commercial buildings, such as warehouses, airplane hangars and the like. The fixture employs a high-wattage (250, 400 or 1000 Watt) HID lamp 10, which may be mercury vapor, metal halide, incandescent, or high or low pressure sodium. The lamp 10 has a threaded base 12, which is screwed into an appropriate mating receptacle mounted in the ceiling of the building. Because of the high wattage of the lamp 10, the screw-in base 12 usually is of larger diameter than the common household light bulbs with lower wattages in the range of 25 to 150 Watts.

The base of the bulb 10 extends through a circular opening in the base of a generally bell-shaped reflector 14; so that the reflector 14 is suspended by and held in place by the lamp 10, which extends through the opening in the reflector. The reflector itself has two primary portions. An upper portion 14A, which is relatively narrow, extends downwardly alongside the neck of the bulb 10. The lower portion 14B is an outwardly flared reflector portion, which increases in diameter from the base of the upper portion 14A to a light-emitting end 16. Typically, a translucent lens is placed in the light-emitting end 16 to improve the dispersement of light from the bulb 10 within the reflector 14.

Figure 2:
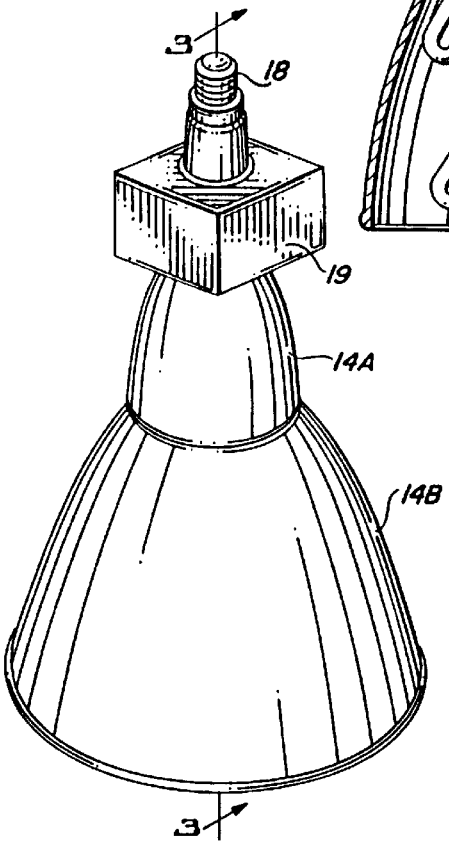
FIG. 2 is a perspective view of a preferred embodiment of the invention.

FIGS. 2, 3, 4 and 5 illustrate a preferred embodiment of the invention for use in replacing the high-wattage HID bulb 10 with an array of compact fluorescent lamps consuming significantly less energy, while at the same time producing equivalent or nearly equivalent lumen output from the reflector 14. As illustrated in FIG. 2, this is accomplished in part by mounting the base end of the reflector portion 14A on a housing 19. This housing has an electrical input to it provided through a mogul screw-in base 18, which matches the size of the base 12 of the lamp being replaced. Each of the several fluorescent lamps, which are located within the lower bell-shaped portion of the housing 14B, is operated by ballasts located within the housing 19. Each ballast, in turn, controls one or two lamps per ballast in a standard manner.

Figure 3:
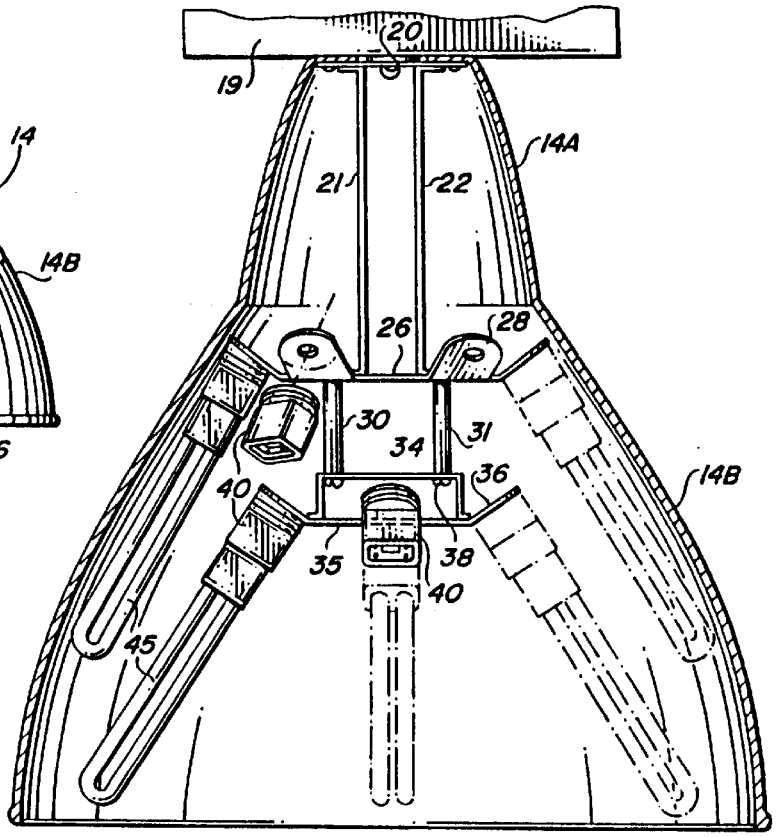
FIG. 3 is cross-sectional view taken along the line 3—3 of FIG. 2.

FIG. 3 illustrates a cross-sectional view of the modification which has been made to adapt the reflector 14 to use a multiple-lamp fluorescent array substituted for the HID lamp 10. This is accomplished by building a lamp support in the portion 14A of the reflector on a base 20, which is secured to the base end of the reflector 14A by means of suitable fasteners, such as screws or bolts, or by means of welding or brazing. The fasteners, which secure the base 20 to the base end of the portion 14A of the reflector 14, also may be extended through the base 20, the base end of the reflector 14 into the housing 19 to secure all of the parts together, if desired. A circular opening (not shown) is provided in the center of the base 20 to accommodate wires from the ballasts located within the housing 19 to be interconnected with the various sockets 40 for the compact fluorescent lamps 45, which are plugged into these sockets. The wires are not shown in FIG. 3 to avoid unnecessary cluttering of the drawing.

The lamp support further includes a pair of elongated "U-shaped" rectangular legs 21 and 22, which are riveted to or otherwise attached at one end to the base member 20, and extend inside the portion 14A of the reflector 14 to support a lamp mounting plate 26 on the opposite end. The lamp mounting plate 26 also is attached to the legs 21 and 22 by means of rivets, brazing or any other suitable means to suspend the plate 26 in the center of the reflector 14B approximately one-third the length of the reflector from the base end to the light exiting end 16. This is illustrated most clearly in FIG. 3.

Figure 4:
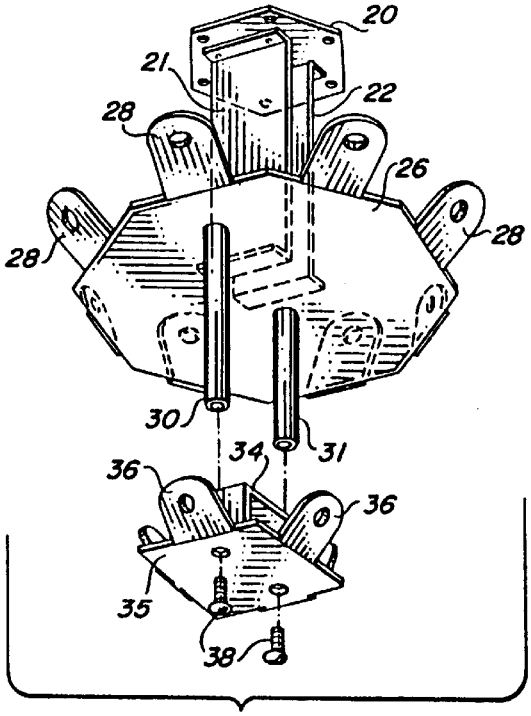
FIG. 4 is a partially exploded view of a detail of the embodiment shown in FIG. 3.

As illustrated in FIGS. 3, 4 and 5, the plate 26 is octagonal in shape, and includes, on each of its outer edges, an extension tab or lamp mounting surface 28 onto which a conventional socket 40 is attached for receiving a commercially available push-in compact fluorescent lamp 45. As illustrated most clearly in FIG. 3, the tabs 28 are bent upwardly (as viewed in FIG. 3) approximately 20° to 30° from the plane of the plate 26 to cause the lamps 45 to extend along a line generally following the curvature of the inside of the reflector portion 14B. The relative positions, which are occupied by at least some of these lamps, are shown in FIG. 3. It is to be understood that eight lamps 45 are connected in a star-like array around the periphery of the octagonal plate 26.

As further illustrated in FIGS. 3, 4 and 5, additional lamps 45 are mounted within the circle of lamps carried on the plate 26. These additional lamps are mounted on a supplementary, smaller plate 35 supported by a pair of posts 30 and 31 attached to a U-shaped bracket 34 on the underside of the plate 35, as illustrated most clearly in FIGS. 3 and 4. Suitable screws or bolts 38 are used to attach the bracket 34 to the ends of the posts 30 and 31. These screws or bolts 38 pass through enlarged holes in the plate 35, so that they can be used to secure the bracket 34 to the ends of the posts 30 and 31.

As illustrated in FIGS. 3, 4 and 5, the plate 35 is shown as a square plate having lamp mounting extensions 36 on each of the four edges. These extensions 36 also are bent upwardly (as viewed in FIG. 3) approximately 20° to 30° to cause the lamps 45, attached to sockets 40 on each of the extensions 36, to assume the configuration illustrated in FIG. 3.

Each of the lamps 45 is a standard compact fluorescent lamp, and typically consumes 27 Watts of power. Such a fluorescent lamp generally is considered equivalent to a 100 Watt incandescent or HID lamp; so that the equivalent wattage output of the twelve lamps 45, shown in the array of the embodiment illustrated in FIGS. 3, 4 and 5, is 1200 Watts. When this array is used to replace a 1000 Watt HID bulb 10, the actual wattage consumed by the twelve lamps is 324 Watts (12×27). This amounts to approximately a two-thirds saving in the energy consumption of the fixture which has been retrofitted as illustrated in FIGS. 3, 4 and 5. To improve the lumen output of the fixture, the surfaces of the plates 26 and 35 may be made of reflective material similar to the polished aluminum interior reflective surface of the portions 14A and 14B of the reflector 14.

In addition to producing an equivalent lumen light output for significantly less energy, the lamp fixture or lamp apparatus of FIGS. 3, 4 and 5 also produces an increased coverage or circle of light in the region beneath the reflector over that which is obtained from the same reflector using an HID bulb 12. As mentioned earlier, the typical coverage for the prior art fixture of FIG. 1 is approximately 1.6 (that is, the circle of light on the floor is approximately 1.6 times the distance from the floor to the lighting-emitting end 16 of the reflector 14). By replacing the HID bulb 10 with the array shown in FIGS. 3, 4 and 5, the coverage from the reflector 14 increases to 2.0 to 2.4 (that is, the circle of light beneath the reflector is from 2.0 to 2.4 times the distance between the floor and the light-emitting end 16 of the fixture). For new installations, this means the fixtures can be spaced farther apart to obtain substantially the same lumen intensity on the surface below the fixtures. This results in decreased installation costs (fewer fixtures are required), and even greater improved savings in the energy consumption (since the overall number of fixtures has been reduced, as well as the wattage consumed by each fixture).

Another significant advantage, which can be obtained with a multiple lamp fixture of the type shown in FIGS. 3, 4 and 5, is that by operating each lamp with an individual ballast or by operating pairs of lamps on opposite sides of each of the star-like arrays on the plates 26 and 35, with a different ballast for each pair, the capability for built-in "dimming" occurs. Reference should be made to FIG. 7 for the manner in which this effected. FIG. 7 is a diagrammatic representation of the electrical circuit which supplies operating power to each of the lamps 45 in the array located within the reflector 14. As illustrated in FIG. 7, alternating current power from a suitable source 60 (as provided to the mogul screw-in base 18, or direct wired) is supplied to switch pairs 61, 71 and 91 through individual ballasts 62, 63, 72, 73 and 92, 93 for each of the lamps 45. Only six lamps and three sets of switches 61, 71 and 91 are illustrated in FIG. 7. It is to be understood, however, that pairs of lamps 45 operated by pairs of ganged switches, such as the switches 61, 71 and 91, may be provided for all twelve of the lamps of the array in FIGS. 3, 4 and 5. The number of lamps shown in FIG. 7, however, is reduced to avoid unnecessary cluttering, since the operation of each pair of lamps is the same as for the three pairs which are shown in FIG. 7.

When all of the switches 61, 71 and 91 are closed, all of the lamps are provided with operating power through their respective ballasts, and, thus, are illuminated. Selective dimming, however, is effected by opening one or more switch pairs to disconnect power from the ballasts driving the lamps associated with the particular opened switch pair, such as 61, 71 or 91. If one of the switch pairs is opened, then ten of the twelve lamps within the array of FIGS. 3, 4 and 5 are illuminated. If three sets of the switch pairs, such as 61, 71 and 91 are opened, half of the lamp pairs are turned off, and half of the lamp pairs 45 remain illuminated, thereby reducing the light output of the fixture by fifty percent. This also reduces the energy consumption by fifty percent. Obviously, the opening of more or less numbers of switch pairs 61, 71 and 91 (and others not shown) can be utilized to provide other "dimming" percentages in accordance with the operating requirements of the system with which the lighting apparatus of FIGS. 3, 4 and 5 is used.

It also should be noted that although FIG. 7 indicates an individual ballast 62, 63, 72, 73 or 92, 93 for each individual lamp 45, a single ballast could be used to drive two lamps; and the system operation for effecting the selective dimming then would require a switching off of only a single ballast for each two lamps. Otherwise, the operation is identical to that described in conjunction with the arrangement shown in FIG. 7.

Control of the operation of the switch pairs 61, 71 and 91 may be effected in any suitable manner. For example, low voltage relay switches could be enclosed within the housing 19, or at a remote on/off switch location, for effecting the desired operation of the switches. Digitally-encoded electronic switching also could be used from a remote or central location, as desired. The manner of effecting the overall dimming, however, is the same; and the technique used to operate the switches 61, 71 and 91 may be any suitable technique currently known, in accordance with the desires of the system installer and/or user. It is important to note that when dimming is effected in the manner described in conjunction with circuit of FIG. 7, there is no illumination flicker, since the lamps 45 which remain illuminated are powered with full power in the normal manner of powering such lamps. It also is possible, however, to provide conventional internal ballast dimming in addition to the switched dimming described above, if desired. Other features, such as uninterruptable power supply, emergency backup capability also may be employed with the system if desired.

FIG. 8 illustrates an alternative variation to provide power to the ballasts within the housing 19 to replace the screw-in base 18, which is illustrated in FIG. 2. For new installations in particular, it is not necessary to provide a screw-in base; and the system may be hard-wired from an electrical box, with the wiring 49 then passing through a suitable knock-out in the housing 19. The wires passing through the knock-out then are connected to the ballast in a conventional manner. For maximum flexibility, the wiring through the knock-out may be passed through a hollow center hook 51 attached to the knock-out by means of a securing nut 56, as illustrated. The hook 51 then is used to hang the housing 19 and the remainder of the fixture attached to it from the ceiling by means of a mating hook 50, illustrated in FIG. 8. In all other respects, the lighting apparatus or fixture, modified as shown in FIG. 8, operates in the manner described above for the embodiment of FIGS. 2, 3, 4 and 5.

FIG. 6 illustrates an alternative embodiment for replacing the plates 26 and 35 with a single smaller plate 46. The configuration with a single plate 46 (illustrated as a hexagonal plate) may be used for smaller reflectors 14, or for reflectors 14 which do not need to produce the quantity of light produced by the embodiment described in conjunction with FIGS. 3, 4 and 5. As illustrated in FIG. 6, six lamp-base holding tabs 48 are provided. If such a configuration is used in place of the plates 26 and 35 of FIG. 3, the arrangement of the six lamps 45, which are attached to the bases 40 on the extensions 48, is similar to that for the lamps shown attached to the bases 26 and 35 illustrated in FIG. 3. The tabs 48 are bent upwardly at approximately a 20° to 30° angle to produce the lighting spread and lumen output desired. In all other respects, a fixture which uses the star-like configuration of FIG. 6 in place of the one shown in FIG. 5, operates in the manner described above for the embodiment of FIGS. 3, 4 and 5.

Reference now should be made to FIGS. 9 through 15, which are directed to another preferred embodiment of the invention. The embodiment shown in these figures is directed to an eight-lamp fixture, which is designed as an original equipment installation rather than as a conversion replacement of the type described above in conjunction with FIGS. 2 through 6. Consequently, the reflector/fixture, shown in FIGS. 9 through 12, is ideally suited for original installation in facilities as a substitute for the HID lamps which ordinarily are used in such facilities.

Figure 9:
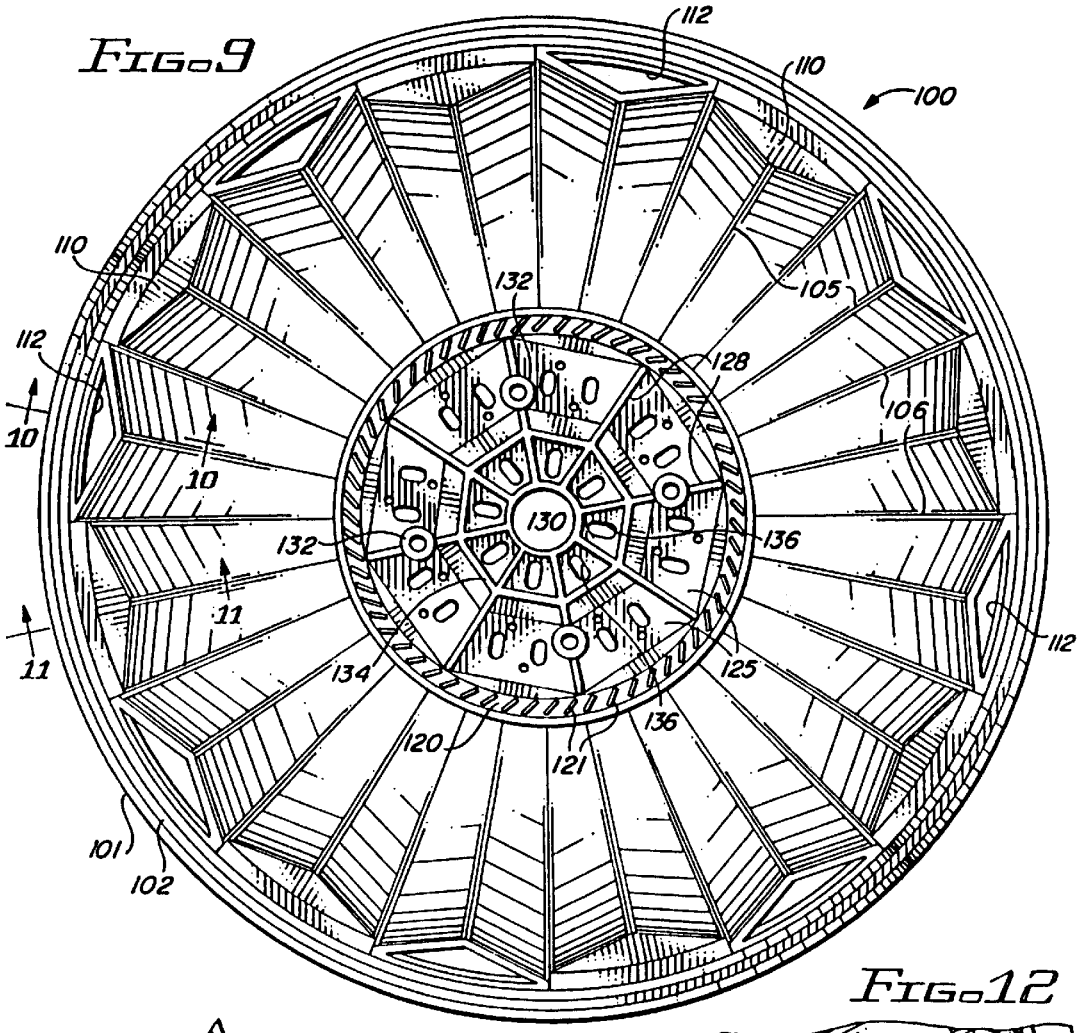
FIG. 9 is a bottom view of another preferred embodiment of the invention.
Figure 10:
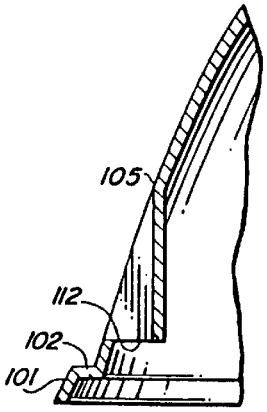
FIG. 10 is a cross-sectional detail taken along the line 10—10 of FIG. 9.
Figure 11:
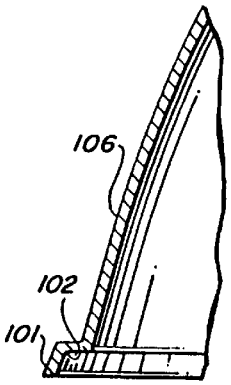
FIG. 11 is a cross-sectional detail taken along the line 11—11 of FIG. 9.

FIG. 9 is a bottom view of the reflector of a molded plastic fixture, which is made as a one-piece integral assembly incorporating lamp support mounts in the base end as a unitary part of the entire reflector assembly. The reflector 100, itself, is a generally circular bell-shaped or outwardly flared fixture, having a base end of a first diameter and a light-emitting end of a substantially greater diameter. Between the base end and the light-emitting end, the reflector portion itself is comprised of a fluted reflector having a series of equally spaced flutes about the periphery. These flutes include inwardly directed flutes or creases 105, alternating with outwardly directed flutes 106, forming a somewhat corrugated appearance to the reflector. Each of the flutes 105 and 106 lie in planes which pass through a center line through the center of the base end of the reflector and the center of the light-emitting end.

The outer edge of the reflector 100 terminates in a flange 101 (shown most clearly in FIGS. 10, 11 and 15), which is provided with an inward stepped portion 102 joined to the various ridges or flutes 105 and 106. The stepped portion 102, in conjunction with the flange 101, provides a mounting ridge in which a glass or acrylic lens (not shown) may be placed when the fixture is in use.

Since a glass lens or an acrylic lens would close off the bottom of the fixture, it is possible for heat buildup to take place within the fixture. To provide cooling for the fixture, alternate ones of the spaces between the ends of each of the inwardly formed grooves or flutes 105 and adjacent ones of the outwardly formed flutes 106 are formed with an open space 112 (illustrated in FIGS. 9, 10 and 15) to permit the passage of air into the interior of the fixture. As illustrated in FIG. 9, every other one of these generally triangularly shaped termination ends is closed or filled for forming alternating structures 110 with each of the open spaces 112.

At the top end or base end of the reflector fixture, a central aperture 130 and several smaller apertures 136 are provided to permit the passage of heated air outwardly from the fixture. Consequently, when the fixture is in use, heat buildup from the lamps within the fixture causes air to enter the interior of the reflector through the openings 112; and this air, as it is heated by the lamps, then exits through the central opening 130 and the apertures 136 to provide a cooling air circulation for the fixture at all times.

Figure 15:
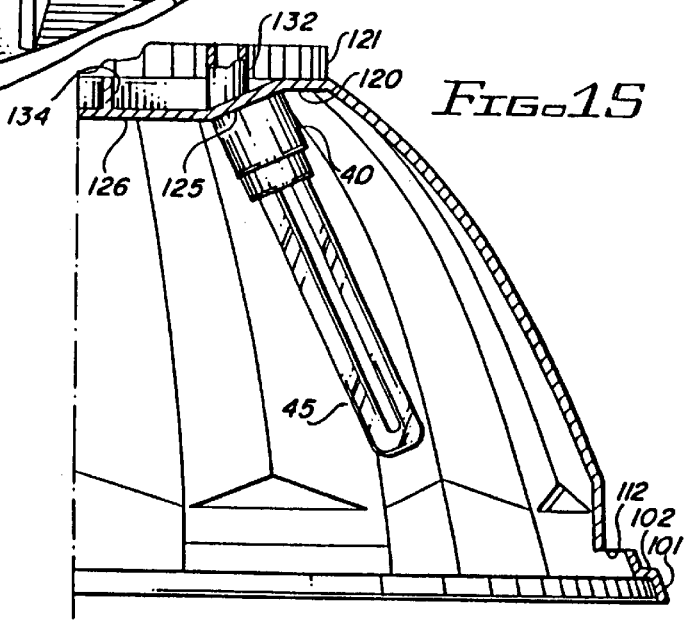
FIG. 15 is a partial cross-sectional view of the device shown in FIGS. 9 through 14.

The base end of the fixture is divided into eight equal segments 125/126 to provide a mounting surface or lamp support surface for mounting compact fluorescent lamps 40/45 on each of the surfaces 125, as illustrated most clearly in FIG. 15. Suitable mounting holes are provided for mounting the lamps and providing electrical interconnections with these lamps and ballasts (not shown) located above the fixture.

Figure 14:
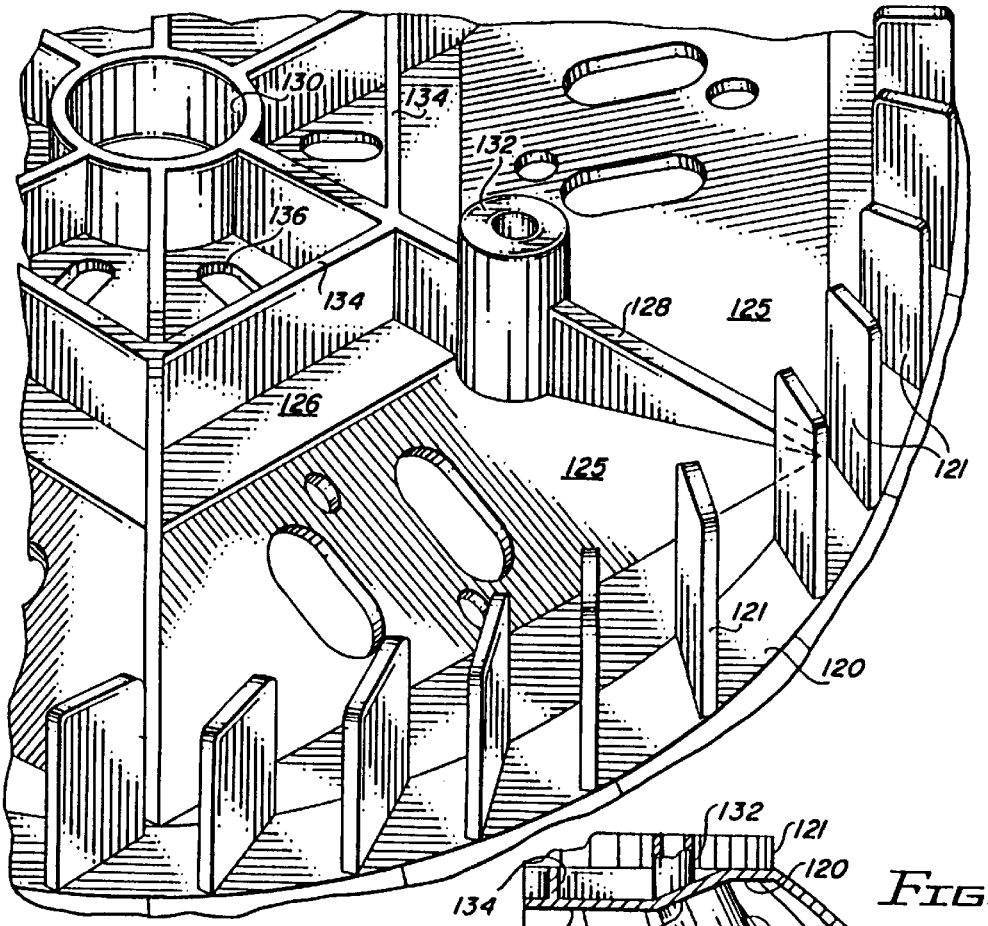
FIG. 14 is a top perspective view of the portion shown in FIG. 12.

As shown most clearly in FIGS. 14 and 15, the mounting surfaces 125 are sloped from the edge located nearest the central axis of the fixture, upwardly toward the base end of the fixture, to cause lamps 40/45 located within the fixture and mounted on the lamp support surfaces 125 to be mounted at an angle extending outwardly from the base end, generally parallel the interior surface of the reflector 100. In this manner, the configuration and location of the various lamps 40/45 is substantially the same as the location and configuration described previously in conjunction with the embodiment shown in FIGS. 2 through 6. In addition, the lamp portion 45 of each of the lamps 40/45 is located so that it is centered on an inwardly facing flute or groove 105; so that light reflected from the lamp by the reflector is dispersed outwardly from the reflector, and is not directed back into the lamp. This improves the efficiency of the operation of the fixture.

As illustrated in FIGS. 9, 12, 13 and 14, the upper surface of the outside of the base of the reflector/fixture 100 includes integrally formed mount posts 132, located on four of eight flanges 128, which provide structural strength and support for each of the eight lamp support surfaces 125. In addition, structural strength is provided for the base of the fixture, so that it is not distorted in mounting, by means of eight ribs 134, which are dispersed about the central portion of the base end around the opening 130. In addition, the outer edge 120 of the base portion of the fixture is provided with a plurality of upstanding ribs or flanges 121, which provide air space around the base of the fixture when it is mounted against a ballast box or the ceiling of a facility in which the fixture is mounted. These ribs 121 permit the passage of heated air, which moves outwardly from the opening 130 and the apertures 136, to be released from the fixture itself. These upstanding flanges 121 serve the additional purpose of reinforcing the base end of the fixture when it is mounted through the mounting posts 132, illustrated most clearly in FIG. 14.

The fixture which is shown in FIGS. 9 through 15 preferably is molded as a unitary piece of high-impact plastic. The interior surface of the reflector portion 100 ideally is coated with a specular material to provide a maximum amount of reflection of the light produced by the eight lamps 40/45 located within the fixture, to cause that light to be reflected out through the light-emitting end of the fixture. The operation of the reflector of the fixture of FIGS. 9 through 15 to produce a highly efficient widespread of light from the various lamps 40/45, located within the fixture, essentially is the same as the light dispersion from the fixture of FIGS. 2 through 6, described above.

Figure 16:
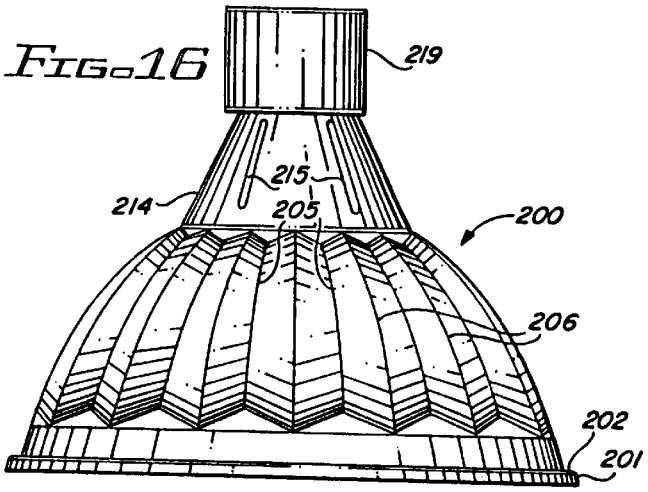
FIG. 16 is a side view of an alternate to the embodiment shown in FIGS. 9 through 15.

FIG. 16 is a side view of another embodiment, which is similar in structure and configuration to the one shown in FIGS. 9 through 15, but which typically is made of metal, such as aluminum and the like. The reflector 200 of the fixture shown in FIG. 16 includes a fluted bell-shaped portion extending from and outwardly flared from a circular base end to terminate in a lens holding rim 201/202, the shape of which is generally the same as the one described above for the reflector of FIGS. 9 through 15. A fluted reflector surface, comprised of inwardly turned creases or ridges 205 alternating with outwardly formed creases or ridges 206, corresponds in shape and function to the similar fluted surface described above in conjunction with the reflector of FIGS. 9 through 15.

At the base or upper end of the reflector 200, there is an extension portion 214, which is similar to the portion 14A of the reflector described above in conjunction with FIGS. 2 through 6. This portion 214 has slots 215, located at uniform intervals about its periphery, to permit the passage of heated air outwardly from the reflector in a manner comparable to the passage of heated air through the central opening 130 and the apertures 136 described above in conjunction with the embodiment of FIGS. 9 through 15. The fixture itself typically is mounted on a ballast 219, as illustrated. In all other respects, the metal or aluminum fixture of FIG. 16 operates and functions in the same manner as the fixtures described above in conjunction with the embodiments of FIGS. 2 through 6 and 9 through 15. The lamps located within the reflector 200 may be mounted in a manner similar to the mounting shown in FIGS. 3 and 4; or a mounting plate, which is integral with the reflector 200, and which has a configuration similar to the lamp support means of the base portion of the reflector of FIGS. 9 through 15, may be employed at the junction of the fluted portion of the reflector 200 and the upper or neck portion 214.

Any of the different embodiments of reflectors, employing a plurality of compact fluorescent lamps 40/45, may be operated in conjunction with the control circuit of FIG. 7 to provide selective operation of all or different ones of the lamps within each of the fixtures, to provide different levels of dimming or light control in accordance with the requirements of light levels at different times in the facility in which the fixtures are installed. The light distribution patterns and the amount of light which is obtained from the various fixtures is substantially the same as that described above in conjunction with the embodiment of FIGS. 2 through 6.

FIG. 7 illustrates, in diagrammatic fashion, the light distribution of a typical installation of fixtures using reflectors of the type described in conjunction with each of the different embodiments of the invention. Typically, the light fixtures are located at spaced intervals on or near the ceiling of a facility. Three spaced light fixtures, for example, employing reflectors 100 of the type disclosed in FIGS. 9 through 15, are shown, and are identified as fixtures or reflectors 100A, 100B and 100C. These fixtures each are spaced at the same distance above the floor of the facility, which is represented in FIG. 17 by the bottom line on which all of the representative light rays from the fixtures 100A, 100B and 100C terminate.

Figure 17:
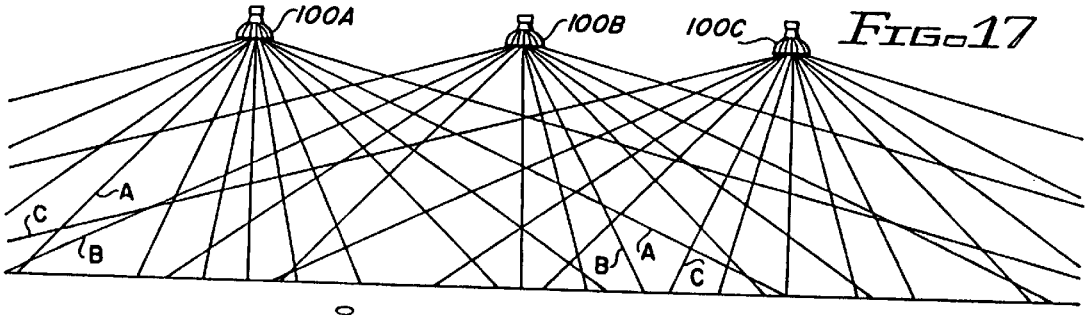
FIG. 17 is a diagrammatic representation of a system layout of the type employing any of the embodiments shown in FIGS. 2 through 16.

As is readily apparent from an examination of FIG. 17, the light rays A from the fixture 100A not only illuminate the floor or surface to be illuminated located directly beneath the fixture 100A, but also extend to the areas beneath the fixtures 100B and 100C, providing a substantial overlap between the light rays from each of the fixtures. Light rays from the fixture 100A are identified by the letter "A"; and the light rays from the fixtures 100B and 100C are identified, respectively, by the letters "B" and "C" in FIG. 17. By the utilization of the multiple fluorescent lamps 40/45 in each of the fixtures, a distribution of light which is highly effective for the lighting of large areas is obtained. Consequently, the fixtures are ideally suitable for lighting schools, gymnasiums, ice skating rinks, warehouses, lobbies, retail centers and the like.

A highly uniform horizontal foot-candle distribution on the surface to be illuminated is obtained from the overlap produced by these fixtures. The spread of light from these fixtures typically is 85°, with significant overlap not only between adjacent fixtures, but fixtures spaced a considerable distance from one another. The spread of light or overlap is greater from each of the reflectors using the six or eight-lamp configuration, which has been described above, than is possible from the same reflectors with a single lamp located in the center. The off-center location of the lamps and their orientation substantially parallel to the interior of the reflectors produces light emanating from the reflectors at significantly greater angles than is possible from a single lamp centered in the reflector.

Figure 18:
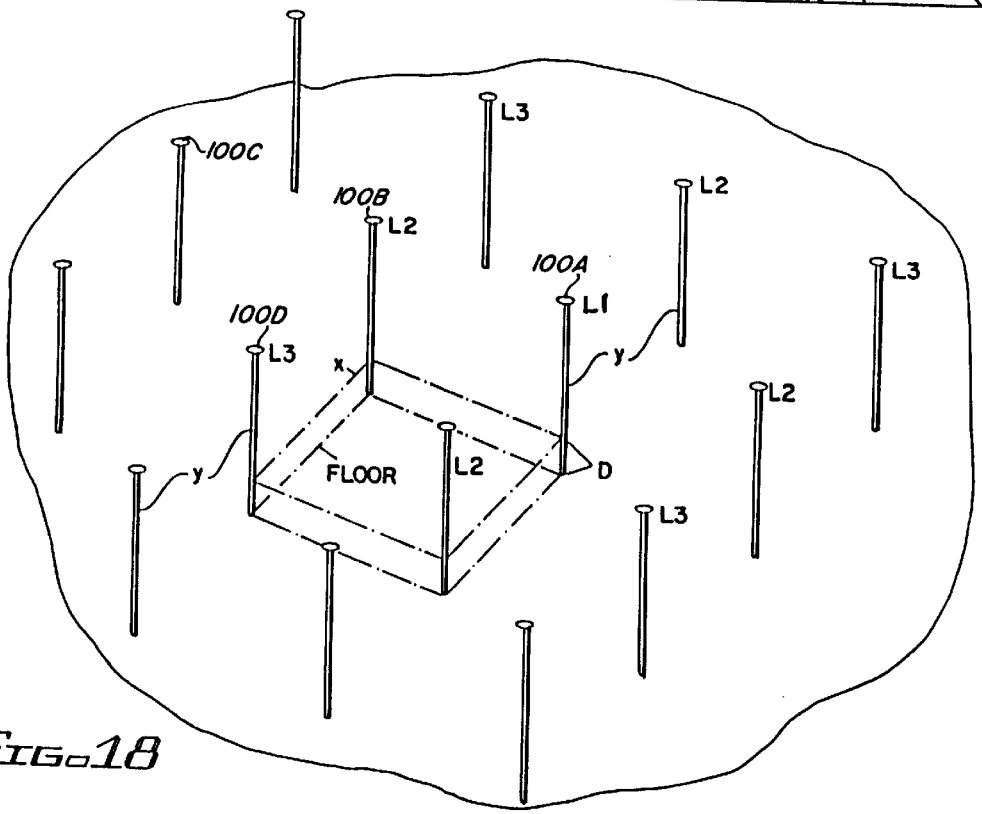
FIG. 18 is a diagrammatic representation of a lighting system employing fixtures of any of the embodiments of FIGS. 2 through 16.

FIG. 18 indicates, in a diagrammatic manner, a typical layout of fixtures of the type described above, and spaced apart to provide the light distribution of the type illustrated in FIG. 17. In the arrangement shown in FIG. 18, a plurality of fixtures is illustrated in a uniform rectangular grid, with each of the fixtures shown as a circle. Several of these fixtures are identified by the designations L1, L2 and L3.

Figure 12:
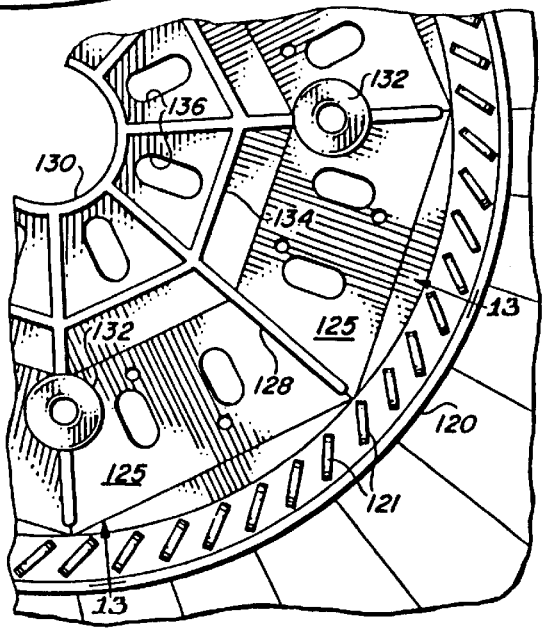
FIG. 12 is an enlarged top view of a portion of the embodiment shown in FIG. 9.
Figure 13:
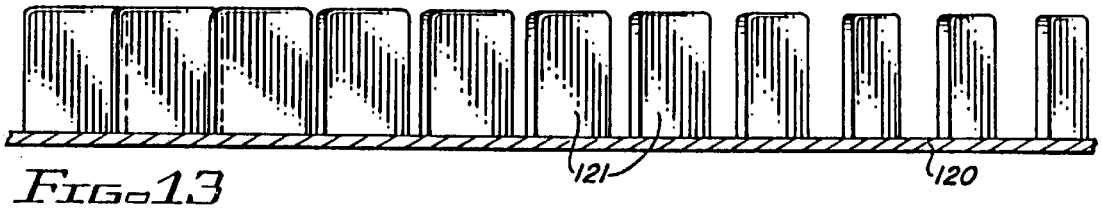
FIG. 13 is a side view of a portion of the structure shown in FIG. 12.

Four of the fixtures located in the center of FIG. 12 are specifically identified as 100A, 100B and 100D. The side-by-side locations of adjacent fixtures 100A and 100B are in accordance with the arrangement shown in FIG. 17. A diagonally located fixture (with respect to the fixture 100A of FIG. 18) is identified as 100D. In addition, the fixtures 100A, the two identified as 100B, and the fourth identified as 100D, are provided with the designations L1, L2 and L3, respectively, in FIG. 18. Each of the fixtures of FIG. 18 is located a distance "Y" above the floor. This distance is indicated as a vertical line extending downwardly from each of the circles representative of the fixtures in FIG. 18. The floor or lowermost surface to be illuminated by the fixtures is identified in FIG. 18 by the designation "floor", and is in the form of dotted lines interconnecting the lower ends of the vertical lines extending from the representative fixtures 100A, 100B and 100D. This forms a square or box-like arrangement, as illustrated in FIG. 18. In addition, a box or square parallel to the "foor" is identified as "X" by dotted lines in FIG. 18. This square is located a uniform distance "D" above the floor, and is used subsequently in a description of the operation of the lighting system of the fixtures employed.

For the purpose of the following description, the fixtures shown in FIG. 18 are each spaced apart twenty feet on center, and each are mounted twenty feet above the floor (WPH=0'). Again, for the purposes of the following discussion, assume that the distance "D" causes the plane "X" to be located four feet above the floor (WPH=4'). The fixtures employed use the reflector of FIGS. 9 through 15; but comparable results are also obtained from fixtures of the other embodiments described above.

Within the rectangle identified by the dotted lines at either the floor or "X" (WPH=0' and WPH=4', respectively), substantially uniform illuminance occurs; and the illuminance is substantially the same at either of the two different work plane heights. Excellent uniformity from the layout system of the fixtures is obtained. Throughout the area, at both of these levels, only relatively minor variations in luminous intensity occur. The amount of light is calculated in accordance with conventional computations, which follow the inverse square law. For the area directly beneath any given luminaire, L1 for example, light contribution directly beneath the luminaire is obtained from the luminaire or fixture L1. Light also is contributed at this same point by the four luminaires L2, located directly north, east, south and west of the point below the luminaire or fixture L1. In addition, light is contributed to this same point by the four luminaires L3, which are immediately diagonal to the point. These nine luminaires, in patterns repeated throughout the lighting system, contribute the large majority of illuminance at each point beneath each of the fixtures. Similar contributions are obtained at all of the points in the rectangles formed beneath any four luminaires, as illustrated by the dotted lines in FIG. 18. The result is that the maximum illuminance at the work plane height of 0 (WPH=0') and the work plane height located four feet above (WPH=4') is substantially the same. In addition, the minimum and average illuminance obtained throughout the area being illuminated is substantially the same, whether the work plane height is at the floor or is located four feet above the floor.

This seems to defy the inverse square law computation. However, as the contribution from the luminaire directly above a point, such as L1, increases (as you move the calculation plane from 0' to 4') the contributions from the other luminaires are decreasing. This is because the angle of incidence is increasing and the intensity from the other luminaires (at that angle) is decreasing. Consequently, the overall effect is a volume of constant luminance from all of the contributing luminaires L1, L2, and L3. It should be noted that this phenomena does not continue all the way up to a point located directly beneath the luminaire. As the computation plane moves above four feet, the contribution from the fixture or luminaire L1 begins to increase faster as the other contributions from the other luminaires decrease. Consequently, the illuminance level increases overall, directly beneath any one of the fixtures as the work plane height approaches the fixtures.

For a typical installation, however, of the type described above in conjunction with FIGS. 17 and 18, extremely uniform illuminance levels in the outlined square in WPH 0 and WPH 4 are obtained. Readings of an actual installation which were obtained in this area at equally spaced one foot intervals (note that the fixtures are spaced apart 20'and are located 20' above WPH=0') are illustrated for an eight-lamp fixture of the type shown in FIGS. 9 through 15. For WPH=0' the following horizontal luminance readings are shown in Table 1.

TABLE 1

| | | | | | | | | | | | | | | | | | | | | |
|---|---|---|---|---|---|---|---|---|---|---|---|---|---|---|---|---|---|---|---|---|
| 24.1 | 24.3 | 24.7 | 25.0 | 25.5 | 25.9 | 26.4 | 26.9 | 27.2 | 27.5 | 27.6 | 27.5 | 27.2 | 26.9 | 26.4 | 25.9 | 25.5 | 25.0 | 24.7 | 24.3 | 24.1 |
| ⊕ | + | + | + | + | + | + | + | + | + | + | + | + | + | + | + | + | + | + | + | ⊕ |
| 24.3 | 24.5 | 24.8 | 25.1 | 25.6 | 26.0 | 26.5 | 27.0 | 27.3 | 27.6 | 27.7 | 27.6 | 27.3 | 27.0 | 26.5 | 26.0 | 25.6 | 25.1 | 24.8 | 24.5 | 24.3 |
| + | + | + | + | + | + | + | + | + | + | + | + | + | + | + | + | + | + | + | + | + |
| 24.7 | 24.8 | 25.0 | 25.4 | 25.8 | 26.2 | 26.7 | 27.1 | 27.5 | 27.7 | 27.8 | 27.7 | 27.5 | 27.1 | 26.7 | 26.2 | 25.8 | 25.4 | 25.0 | 24.8 | 24.7 |
| + | + | + | + | + | + | + | + | + | + | + | + | + | + | + | + | + | + | + | + | + |
| 25.0 | 25.1 | 25.4 | 25.7 | 26.1 | 26.5 | 27.0 | 27.4 | 27.7 | 28.0 | 28.1 | 28.0 | 27.7 | 27.4 | 27.0 | 26.5 | 26.1 | 25.7 | 25.4 | 25.1 | 25.0 |
| + | + | + | + | + | + | + | + | + | + | + | + | + | + | + | + | + | + | + | + | + |
| 25.5 | 25.6 | 25.8 | 26.1 | 26.5 | 26.9 | 27.3 | 27.7 | 28.0 | 28.2 | 28.3 | 28.2 | 28.0 | 27.7 | 27.3 | 26.9 | 26.5 | 26.1 | 25.8 | 25.6 | 25.5 |
| + | + | + | + | + | + | + | + | + | + | + | + | + | + | + | + | + | + | + | + | + |
| 25.9 | 26.0 | 26.2 | 26.5 | 26.9 | 27.3 | 27.6 | 28.0 | 28.3 | 28.5 | 28.6 | 28.5 | 28.3 | 28.0 | 27.6 | 27.3 | 26.9 | 26.5 | 26.2 | 26.0 | 25.9 |
| + | + | + | + | + | + | + | + | + | + | + | + | + | + | + | + | + | + | + | + | + |
| 26.4 | 26.5 | 26.7 | 27.0 | 27.3 | 27.6 | 28.0 | 28.3 | 28.6 | 28.8 | 28.8 | 28.8 | 28.6 | 28.3 | 28.0 | 27.6 | 27.3 | 27.0 | 26.7 | 26.5 | 26.4 |
| + | + | + | + | + | + | + | + | + | + | + | + | + | + | + | + | + | + | + | + | + |
| 26.9 | 27.0 | 27.1 | 27.4 | 27.7 | 28.0 | 28.3 | 28.6 | 28.9 | 29.0 | 29.0 | 29.0 | 28.9 | 28.6 | 28.3 | 28.0 | 27.7 | 27.4 | 27.1 | 27.0 | 26.9 |
| + | + | + | + | + | + | + | + | + | + | + | + | + | + | + | + | + | + | + | + | + |
| 27.2 | 27.3 | 27.5 | 27.7 | 28.0 | 28.3 | 28.6 | 28.9 | 29.0 | 29.2 | 29.2 | 29.2 | 29.0 | 28.9 | 28.6 | 28.3 | 28.0 | 27.7 | 27.5 | 27.3 | 27.2 |
| + | + | + | + | + | + | + | + | + | + | + | + | + | + | + | + | + | + | + | + | + |
| 27.5 | 27.6 | 27.7 | 28.0 | 28.2 | 28.5 | 28.8 | 29.0 | 29.2 | 29.3 | 29.3 | 29.3 | 29.2 | 29.0 | 28.8 | 28.5 | 28.2 | 28.0 | 27.7 | 27.6 | 27.5 |
| + | + | + | + | + | + | + | + | + | + | + | + | + | + | + | + | + | + | + | + | + |
| 27.6 | 27.7 | 27.8 | 28.1 | 28.3 | 28.6 | 28.8 | 29.0 | 29.2 | 29.3 | 29.4 | 29.3 | 29.2 | 29.0 | 28.8 | 28.6 | 28.3 | 28.1 | 27.8 | 27.7 | 27.6 |
| + | + | + | + | + | + | + | + | + | + | + | + | + | + | + | + | + | + | + | + | + |

TABLE 1-continued

| | | | | | | | | | | | | | | | | | | | | |
|---|---|---|---|---|---|---|---|---|---|---|---|---|---|---|---|---|---|---|---|---|
| 27.5 | 27.6 | 27.7 | 28.0 | 28.2 | 28.5 | 28.8 | 29.0 | 29.2 | 29.3 | 29.3 | 29.3 | 29.2 | 29.0 | 28.8 | 28.5 | 28.2 | 28.0 | 27.7 | 27.6 | 27.5 |
| + | + | + | + | + | + | + | + | + | + | + | + | + | + | + | + | + | + | + | + | + |
| 27.2 | 27.3 | 27.5 | 27.7 | 28.0 | 28.3 | 28.6 | 28.9 | 29.0 | 29.2 | 29.2 | 29.2 | 29.0 | 28.9 | 28.6 | 28.3 | 28.0 | 27.7 | 27.5 | 27.3 | 27.2 |
| + | + | + | + | + | + | + | + | + | + | + | + | + | + | + | + | + | + | + | + | + |
| 26.9 | 27.0 | 27.1 | 27.4 | 27.7 | 28.0 | 28.3 | 28.6 | 28.9 | 29.0 | 29.0 | 29.0 | 28.9 | 28.6 | 28.3 | 28.0 | 27.7 | 27.4 | 27.1 | 27.0 | 26.9 |
| + | + | + | + | + | + | + | + | + | + | + | + | + | + | + | + | + | + | + | + | + |
| 26.4 | 26.5 | 26.7 | 27.0 | 27.3 | 27.6 | 28.0 | 28.3 | 28.6 | 28.8 | 28.8 | 28.8 | 28.6 | 28.3 | 28.0 | 27.6 | 27.3 | 27.0 | 26.7 | 26.5 | 26.4 |
| + | + | + | + | + | + | + | + | + | + | + | + | + | + | + | + | + | + | + | + | + |
| 25.9 | 26.0 | 26.2 | 26.5 | 26.9 | 27.3 | 27.6 | 28.0 | 28.3 | 28.5 | 28.6 | 28.5 | 28.3 | 28.0 | 27.6 | 27.3 | 26.9 | 26.5 | 26.2 | 26.0 | 25.9 |
| + | + | + | + | + | + | + | + | + | + | + | + | + | + | + | + | + | + | + | + | + |
| 25.5 | 25.6 | 25.8 | 26.1 | 26.5 | 26.9 | 27.3 | 27.7 | 28.0 | 28.2 | 28.3 | 28.2 | 28.0 | 27.7 | 27.3 | 26.9 | 26.5 | 26.1 | 25.8 | 25.6 | 25.5 |
| + | + | + | + | + | + | + | + | + | + | + | + | + | + | + | + | + | + | + | + | + |
| 25.0 | 25.1 | 25.4 | 25.7 | 26.1 | 26.5 | 27.0 | 27.4 | 27.7 | 28.0 | 28.1 | 28.0 | 27.7 | 27.4 | 27.0 | 26.5 | 26.1 | 25.7 | 25.4 | 25.1 | 25.0 |
| + | + | + | + | + | + | + | + | + | + | + | + | + | + | + | + | + | + | + | + | + |
| 24.7 | 24.8 | 25.0 | 25.4 | 25.8 | 26.2 | 26.7 | 27.1 | 27.5 | 27.7 | 27.8 | 27.7 | 27.5 | 27.1 | 26.7 | 26.2 | 25.8 | 25.4 | 25.0 | 24.8 | 24.7 |
| + | + | + | + | + | + | + | + | + | + | + | + | + | + | + | + | + | + | + | + | + |
| 24.3 | 24.5 | 24.8 | 25.1 | 25.6 | 26.0 | 26.5 | 27.0 | 27.3 | 27.6 | 27.7 | 27.6 | 27.3 | 27.0 | 26.5 | 26.0 | 25.6 | 25.1 | 24.8 | 24.5 | 24.3 |
| + | + | + | + | + | + | + | + | + | + | + | + | + | + | + | + | + | + | + | + | + |
| 24.1 | 24.3 | 24.7 | 25.0 | 25.5 | 25.9 | 26.4 | 26.9 | 27.2 | 27.5 | 27.6 | 27.5 | 27.2 | 26.9 | 26.4 | 25.9 | 25.5 | 25.0 | 24.7 | 24.3 | 24.1 |
| ⊕ | + | + | + | + | + | + | + | + | + | + | + | + | + | + | + | + | + | + | + | ⊕ |

It should be noted that for the above readings, the horizontal units are in foot-candles. As is apparent, the maximum value is at the center of the region, the fixtures themselves are located at the four corners and identified by the circles in the corners in Table 1. For WPH 0 the readings in foot-candles are as follows:

Maximum Value=29.4

Minimum Value=24.1

Average Value=27.1

Maximum/Minimum=1.2

Maximum Average=1.1

Average/Minimum=1.1

Coef. of Variance=0.3

For the same fixtures, operated at the same intensity level, a measurement then was taken in plane X, work plane height four feet (WPH=4'); and the results are shown in Table 2 below:

TABLE 2

| | | | | | | | | | | | | | | | | | | | | |
|---|---|---|---|---|---|---|---|---|---|---|---|---|---|---|---|---|---|---|---|---|
| 23.4 | 23.7 | 24.2 | 24.9 | 25.7 | 26.5 | 27.4 | 28.2 | 28.9 | 29.3 | 29.4 | 29.3 | 28.9 | 28.2 | 27.4 | 26.5 | 25.7 | 24.9 | 24.2 | 23.7 | 23.4 |
| ⊕ | + | + | + | + | + | + | + | + | + | + | + | + | + | + | + | + | + | + | + | ⊕ |
| 23.7 | 24.0 | 24.4 | 25.1 | 25.8 | 26.6 | 27.5 | 28.3 | 28.9 | 29.3 | 29.5 | 29.3 | 28.9 | 28.3 | 27.5 | 26.6 | 25.8 | 25.1 | 24.4 | 24.0 | 23.7 |
| + | + | + | + | + | + | + | + | + | + | + | + | + | + | + | + | + | + | + | + | + |
| 24.2 | 24.4 | 24.8 | 25.4 | 26.1 | 26.9 | 27.7 | 28.4 | 29.0 | 29.4 | 29.5 | 29.4 | 29.0 | 28.4 | 27.7 | 26.9 | 26.1 | 25.4 | 24.8 | 24.4 | 24.2 |
| + | + | + | + | + | + | + | + | + | + | + | + | + | + | + | + | + | + | + | + | + |
| 24.9 | 25.1 | 25.4 | 25.9 | 26.5 | 27.3 | 28.0 | 28.6 | 29.1 | 29.4 | 29.5 | 29.4 | 29.1 | 28.6 | 28.0 | 27.3 | 26.5 | 25.9 | 25.4 | 25.1 | 24.9 |
| + | + | + | + | + | + | + | + | + | + | + | + | + | + | + | + | + | + | + | + | + |
| 25.7 | 25.8 | 26.1 | 26.5 | 27.1 | 27.7 | 28.3 | 28.8 | 29.2 | 29.4 | 29.5 | 29.4 | 29.2 | 28.8 | 28.3 | 27.7 | 27.1 | 26.5 | 26.1 | 25.8 | 25.7 |
| + | + | + | + | + | + | + | + | + | + | + | + | + | + | + | + | + | + | + | + | + |
| 26.5 | 26.6 | 26.9 | 27.3 | 27.7 | 28.2 | 28.6 | 29.0 | 29.3 | 29.4 | 29.5 | 29.4 | 29.3 | 29.0 | 28.6 | 28.2 | 27.7 | 27.3 | 26.9 | 26.6 | 26.5 |
| + | + | + | + | + | + | + | + | + | + | + | + | + | + | + | + | + | + | + | + | + |
| 27.4 | 27.5 | 27.7 | 28.0 | 28.3 | 28.6 | 28.9 | 29.2 | 29.3 | 29.4 | 29.4 | 29.4 | 29.3 | 29.2 | 28.9 | 28.6 | 28.3 | 28.0 | 27.7 | 27.5 | 27.4 |
| + | + | + | + | + | + | + | + | + | + | + | + | + | + | + | + | + | + | + | + | + |
| 28.2 | 28.3 | 28.4 | 28.6 | 28.8 | 29.0 | 29.2 | 29.3 | 29.3 | 29.4 | 29.4 | 29.4 | 29.3 | 29.3 | 29.2 | 29.0 | 28.8 | 28.6 | 28.4 | 28.3 | 28.2 |
| + | + | + | + | + | + | + | + | + | + | + | + | + | + | + | + | + | + | + | + | + |
| 28.9 | 28.9 | 29.0 | 29.1 | 29.2 | 29.3 | 29.3 | 29.3 | 29.3 | 29.3 | 29.3 | 29.3 | 29.3 | 29.3 | 29.3 | 29.3 | 29.2 | 29.1 | 29.0 | 28.9 | 28.9 |
| + | + | + | + | + | + | + | + | + | + | + | + | + | + | + | + | + | + | + | + | + |
| 29.3 | 29.3 | 29.4 | 29.4 | 29.4 | 29.4 | 29.4 | 29.4 | 29.3 | 29.3 | 29.3 | 29.3 | 29.3 | 29.4 | 29.4 | 29.4 | 29.4 | 29.4 | 29.4 | 29.3 | 29.3 |
| + | + | + | + | + | + | + | + | + | + | + | + | + | + | + | + | + | + | + | + | + |
| 29.4 | 29.5 | 29.5 | 29.5 | 29.5 | 29.5 | 29.4 | 29.4 | 29.3 | 29.3 | 29.2 | 29.3 | 29.3 | 29.4 | 29.4 | 29.5 | 29.5 | 29.5 | 29.5 | 29.5 | 29.4 |
| + | + | + | + | + | + | + | + | + | + | + | + | + | + | + | + | + | + | + | + | + |
| 29.3 | 29.3 | 29.4 | 29.4 | 29.4 | 29.4 | 29.4 | 29.4 | 29.3 | 29.3 | 29.3 | 29.3 | 29.3 | 29.4 | 29.4 | 29.4 | 29.4 | 29.4 | 29.4 | 29.3 | 29.3 |
| + | + | + | + | + | + | + | + | + | + | + | + | + | + | + | + | + | + | + | + | + |
| 28.9 | 28.9 | 29.0 | 29.1 | 29.2 | 29.3 | 29.3 | 29.3 | 29.3 | 29.3 | 29.3 | 29.3 | 29.3 | 29.3 | 29.3 | 29.3 | 29.2 | 29.1 | 29.0 | 28.9 | 28.9 |
| + | + | + | + | + | + | + | + | + | + | + | + | + | + | + | + | + | + | + | + | + |
| 28.2 | 28.3 | 28.4 | 28.6 | 28.8 | 29.0 | 29.2 | 29.3 | 29.3 | 29.4 | 29.4 | 29.4 | 29.3 | 29.3 | 29.2 | 29.0 | 28.8 | 28.6 | 28.4 | 28.3 | 28.2 |
| + | + | + | + | + | + | + | + | + | + | + | + | + | + | + | + | + | + | + | + | + |
| 27.4 | 27.5 | 27.7 | 28.0 | 28.3 | 28.6 | 28.9 | 29.2 | 29.3 | 29.4 | 29.4 | 29.4 | 29.3 | 29.2 | 28.9 | 28.6 | 28.3 | 28.0 | 27.7 | 27.5 | 27.4 |
| + | + | + | + | + | + | + | + | + | + | + | + | + | + | + | + | + | + | + | + | + |
| 26.5 | 26.6 | 26.9 | 27.3 | 27.7 | 28.2 | 28.6 | 29.0 | 29.3 | 29.4 | 29.5 | 29.4 | 29.3 | 29.0 | 28.6 | 28.2 | 27.7 | 27.3 | 26.9 | 26.6 | 26.5 |
| + | + | + | + | + | + | + | + | + | + | + | + | + | + | + | + | + | + | + | + | + |
| 25.7 | 25.8 | 26.1 | 26.5 | 27.1 | 27.7 | 28.3 | 28.8 | 29.2 | 29.4 | 29.5 | 29.4 | 29.2 | 28.8 | 28.3 | 27.7 | 27.1 | 26.5 | 26.1 | 25.8 | 25.7 |
| + | + | + | + | + | + | + | + | + | + | + | + | + | + | + | + | + | + | + | + | + |
| 24.9 | 25.1 | 25.4 | 25.9 | 26.5 | 27.3 | 28.0 | 28.6 | 29.1 | 29.4 | 29.5 | 29.4 | 29.1 | 28.6 | 28.0 | 27.3 | 26.5 | 25.9 | 25.4 | 25.1 | 24.9 |
| + | + | + | + | + | + | + | + | + | + | + | + | + | + | + | + | + | + | + | + | + |
| 24.2 | 24.4 | 24.8 | 25.4 | 26.1 | 26.9 | 27.7 | 28.4 | 29.0 | 29.4 | 29.5 | 29.4 | 29.0 | 28.4 | 27.7 | 26.9 | 26.1 | 25.4 | 24.8 | 24.4 | 24.2 |
| + | + | + | + | + | + | + | + | + | + | + | + | + | + | + | + | + | + | + | + | + |

TABLE 2-continued

| | | | | | | | | | | | | | | | | | | | | |
|---|---|---|---|---|---|---|---|---|---|---|---|---|---|---|---|---|---|---|---|---|
| 23.7 | 24.0 | 24.4 | 25.1 | 25.8 | 26.6 | 27.5 | 28.3 | 28.9 | 29.3 | 29.5 | 29.3 | 28.9 | 28.3 | 27.5 | 26.6 | 25.8 | 25.1 | 24.4 | 24.0 | 23.7 |
| + | + | + | + | + | + | + | + | + | + | + | + | + | + | + | + | + | + | + | + | + |
| 23.4 | 23.7 | 24.2 | 24.9 | 25.7 | 26.5 | 27.4 | 28.2 | 28.9 | 29.3 | 29.4 | 29.3 | 28.9 | 28.2 | 27.4 | 26.5 | 25.7 | 24.9 | 24.2 | 23.7 | 23.4 |
| ⊕ | + | + | + | + | + | + | + | + | + | + | + | + | + | + | + | + | + | + | + | ⊕ |

For Table 2, the units are in foot-candles; and the results are as follows:

Maximum Value=29.5

Minimum Value=23.4

Average Value=27.9

Maximum/Minimum=1.3

Maximum/Average=1.1

Average/Minimum=1.2

Coef. of Variance=0.3

Because of the widespread distribution pattern of the light, these uniform horizontal foot-candle light readings clearly show that the system produces a uniform volume of light, and not just a uniform horizontal plane of light. This is important for installations where objects need to be seen above floor level, or above some basic illumination plane. For example, in sports arenas a ball may travel through the air and pass through different vertical heights beneath the illumination system. Another situation is where there is shelving, and objects are stacked vertically, such as in supermarkets and warehouses. Since a uniform volume of light is produced by the system, and not just a uniform horizontal plane of light, significantly improved useful lighting is obtained from the system. For typical metal halide fixture, more concentrated light distribution is provided. Much less overlap of the light from adjacent fixtures occurs; and uniformity is poorer than with the system described above. In particular, in heights above ground level of WPH=0, uniformity with conventional lighting systems typically is very poor, as the light level increases quickly directly beneath fixtures with increasing distance from the floor, while it decreases at points between the fixtures. This causes a significant deterioration of uniformity of the light level above the floor level.

Lighting designers in the past have paid considerable attention to levels of foot-candles, failing to take into account that objects being lighted may be located in a vertical plane. For example, in warehouses and supermarkets most objects to be seen are vertical. In a sports arena, a moving bail may be seen from the side; and thus the light levels in a generally vertical plane are very important. The system, which is described above and which is illustrated diagrammatically in FIGS. 17 and 18, not only operates at a relatively low energy level and high efficiency, which in and of themselves are significant advantages, but in addition, this uniform volume of light produces improved overall visibility in vertical planes which has not been obtained from other systems of the prior art.

Various changes and modifications will occur to those skilled in the art, without departing from the true scope of this invention as defined in the appended claims.

I claim:

1. Lighting apparatus including in combination:

reflector means having a base end of a first size and a light-emitting end of a second size larger than said first size and having a center line extending from the center of the base end to the center of the light-emitting end thereof;

lamp support means located within said reflector means at the base end thereof for supporting a plurality of compact fluorescent lamps substantially equally angularly displaced about said center line within said reflector means between the base end and the light-emitting end thereof, said lamp support means including at least two lamp support surfaces on said lamp support means on opposite sides thereof and angled toward the base end of said reflector means for causing compact fluorescent lamps supported thereby to extend outwardly at an angle from said center line toward the light-emitting end of said reflector means to substantially parallel said reflector means; and means for supplying operating electric power to lamps supported by said lamp support means.

2. The combination according to claim 1 wherein said lamp support means comprises an integral part of the base end of said reflector means.

3. The combination according to claim 2 wherein said lamp support surfaces on said lamp support means are located adjacent said reflector means and are angled toward the base end of said reflector means by an amount selected to cause compact fluorescent lamps supported thereby to be more closely located to said reflector means than to said center line.

4. The combination according to claim 3 wherein said reflector means has substantially circular cross sections in planes perpendicular to said center line.

5. The combination according to claim 4 wherein said substantially circular cross sections increase in diameter from the base end of said reflector means to the light-emitting end thereof.

6. The combination according to claim 1 wherein said first size of said base end of said reflector means is a first diameter and said second size of said light-emitting end of said reflector means is a second diameter.

7. The combination according to claim 1 wherein said lamp support surfaces on said lamp support means are located adjacent said reflector means and are angled toward the base end of said reflector means by an amount selected to cause compact fluorescent lamps supported thereby to be more closely located to said reflector means than to said center line.

8. The combination according to claim 1 wherein said reflector means has substantially circular cross sections in planes perpendicular to said center line.

9. The combination according to claim 8 wherein said substantially circular cross sections increase in diameter from the base end of said reflector means to the light-emitting end thereof.

10. [The combination according to claim 1] *Lighting apparatus including in combination:*

*reflector means having a base end of first size and a light-emitting end of a second size larger than said first size and having a center line extending from the center of the base end to the center of the light-emitting end thereof;*

*lamp support means located within said reflector means at the base end thereof for supporting a plurality of*

*compact fluorescent lamps substantially equally angularly displaced about said center line within said reflector means between the base end and the light-emitting end thereof, said lamp support means including at least two lamp support surfaces on said lamp support means on opposite sides thereof and angled toward the base end of said reflector means for causing compact fluorescent lamps supported thereby to extend outwardly at an angle from said center line toward the light emitting end of said reflector means to substantially parallel said reflector means;*

*means for supplying operating electric power to lamps supported by said lamp support means; and* wherein said lamp support means includes eight equally-spaced lamp support surfaces thereon.

11. The combination according to claim 10 wherein said lamp support surfaces on said lamp support means are located adjacent said reflector means and are angled toward the base end of said reflector means by an amount selected to cause compact fluorescent lamps supported thereby to be more closely located to said reflector means than to said center line.

12. The combination according to claim 1 wherein said reflector means is a generally bell-shaped fluted reflector with the flutes lying in planes passing through said center line.

13. [The combination according to claim 12] *Lighting apparatus including in combination:*

*reflector means having a base end of first size and a light-emitting end of a second size larger than said first size and having a center line extending from the center of the base end to the center of the light-emitting end thereof;*

*lamp support means located within said reflector means at the base end thereof for supporting a plurality of compact fluorescent lamps substantially equally angularly displaced about said center line within said reflector means between the base end and the light-emitting end thereof, said lamp support means including at least two lamp support surfaces on said lamp support means on opposite sides thereof and angled toward the base end of said reflector means for causing compact fluorescent lamps supported thereby to extend outwardly at an angle from said center line toward the light emitting end of said reflector means to substantially parallel said reflector means;*

*means for supplying operating electric power to lamps supported by said lamp support means;*

*wherein said reflector means is a generally bell-shaped fluted reflector with the flutes lying in planes passing through said center line; and* wherein portions of the flutes of said fluted reflector which lie closest to said center line also are located to be substantially centered with compact fluorescent lamps mounted on said lamp support surfaces.

14. The combination according to claim 13 wherein said lamp support surfaces on said lamp support means are located adjacent said reflector means and are angled toward the base end of said reflector means by an amount selected to cause compact fluorescent lamps supported thereby to be more closely located to said reflector means than to said center line.

15. An illumination system having a plurality of reflector means located a predetermined distance from a surface to be illuminated and spaced apart in a predetermined grid pattern above the surface to be illuminated, in which each of said reflector means has a base end of a first size and a light-emitting end of a second size larger than said first size, and having a center line extending from the center of the base end to the center of the light-emitting end thereof, said system including;

a plurality of lamp support means, each located within a different one of said reflector means at the base end thereof for supporting a plurality of [compound] *compact* fluorescent lamps substantially equally angularly displaced about said center line within each of said reflector means between the base end and the light-emitting end thereof, said lamp support means comprising a support member including at least two lamp support surfaces on opposite sides thereof, and angled toward the base end of said reflector means for causing compact fluorescent lamps supported thereby to extend outwardly at an angle from said center line toward the light-emitting end of said reflector means to substantially parallel said reflector means;

means for supplying operating electric power to lamps supported by said lamp support means; and said predetermined spacing between said reflector means being such that light emanating from the light-emitting end of each of said reflector means at a work plane height overlaps light emitted from others of said reflector means in said pattern, and other reflector means in said pattern beyond the nearest reflector means to each of said reflector means.

16. The combination according to claim 15 wherein each of said reflector means has substantially circular cross sections in planes perpendicular to said center line.

17. The combination according to claim 16 wherein said substantially circular cross sections increase in diameter from the base end of each of said reflector means to the light-emitting means thereof.

18. The combination according to claim 17 wherein each of said reflector means comprises an outwardly flared inside surface, and wherein said lamp support surfaces are located to cause compact fluorescent lamps supported thereby to be oriented substantially parallel to said outwardly flared reflector means.

19. The combination according to claim 18 wherein means for supplying electric power operates to selectively apply power to different numbers of lamps supported by said support means in each of said reflector means.

20. The combination according to claim 19 wherein said means for supplying operating electric power further includes a plurality of ballasts associated with each of said reflector means for supplying power to corresponding lamps supported by said lamp support means.

21. The combination according to claim 15 wherein each of said reflector means comprises an outwardly flared inside surface.

22. The combination according to claim 19 wherein means for supplying electric power operates to selectively apply power to different numbers of lamps supported by said support means in each of said reflector means.

23. The combination according to claim 15 wherein means for supplying electric power operates to selectively apply power to different numbers of lamps supported by said support means in each of said reflector means.

*24. A lighting apparatus including in combination:*

*an outwardly flared fixture having a base end of a first size and a light-emitting end of a second size larger than the first size, and having a center line extending from the center of the base end to the center of the light-emitting end thereof, and including a plurality of flutes configured to disperse light through the light emitting end of the fixture;*

*a plurality of linear light sources, each source including a light-generating portion that is at least twice as long as its width;*

*a support located within the fixture at the base end thereof configured to support the plurality of linear light sources angularly displaced about the center line within the fixture between the base end and the light emitting end thereof, the support including a plurality of support surfaces, each support surface configured to support the linear light sources so that the length of the light-generating portions extend outwardly at an angle from the center line toward the light-emitting end of the fixture to substantially parallel the fixture such that each of a plurality of points located along the fixture receives a plurality of light rays with various angles of incidence and emanating from along the length of the light-generating portions of the linear light sources, so that light rays are dispersed through the larger light-emitting end of the fixture in both vertical and horizontal components to directly generate a defined circle of light beneath the fixture; and*

*a power supply circuit coupled to and supplying operating electric power to linear light sources supported by the support.*

*25. The lighting apparatus of claim 24 wherein the linear light sources are mounted on the support surfaces relative to the fixture so that the light rays emanating from the light emitting end of the fixture collectively create a circle of light at a surface to be illuminated beneath the lighting apparatus, and wherein the circle of light has a diameter that is at least two times the distance between the light-emitting end of the fixture and the surface to be illuminated.*

*26. The lighting apparatus of claim 24 wherein the length of the light-generating portions of the linear light sources that parallel the outwardly flared fixture is greater than or equal to one fourth the distance from the base end to the light-emitting end.*

*27. The lighting apparatus of claim 24 wherein the power supply circuit includes a power selection circuit coupled to and selectively applying power to different numbers of linear light sources supported by the support surfaces in the fixture.*

*28. The lighting apparatus of claim 27 wherein the power supply circuit further includes a plurality of remote ballasts, each ballast being coupled to corresponding linear light sources supported by the support surfaces.*

*29. The lighting apparatus of claim 28 wherein the plurality of ballasts are located external to the outwardly flared fixture.*

*30. The combination according to claim 24 further comprising a plurality of the lighting apparatuses located a predetermined distance from a surface to be illuminated and spaced apart in a predetermined grid pattern above the surface to be illuminated to form an illumination system wherein the light emanating from the light-emitting end of each of the fixtures and received at a plurality of work plane heights, located from zero to at least four feet above the surface to be illuminated, overlaps light emitted from others of the fixtures in the pattern, beyond the next nearest fixture, in such a manner as to provide a substantially uniform distribution of light at and between each work plane height.*

*31. The combination according to claim 24 further comprising a plurality of the lighting apparatuses located a predetermined distance from a surface to be illuminated and spaced apart in a predetermined grid pattern above the surface to be illuminated to form an illumination system wherein the light emanating from the light-emitting end of each of the fixtures and received at a plurality of work plane heights, located from zero to at least 20 percent of the predetermined distance above the surface to be illuminated, overlaps light emitted from others of the fixtures in the pattern, beyond the next nearest fixture, in such a manner as to provide a substantially uniform distribution of light at and between each work plane height.*

*32. The lighting apparatus of claim 24 wherein the power supply circuit includes a power selection circuit that operates to vary the amount of light emitted from the light-emitting end.*

*33. The lighting apparatus of claim 24 wherein the linear light sources are mounted on the support surfaces relative to the fixture so that the light rays emanating from the light emitting end of the fixture collectively create a circle of light at a surface to be illuminated beneath the lighting apparatus, and wherein the circle of light has a diameter that is within 2.0 to 2.4 times the distance between the light emitting end of the fixture and the surface to be illuminated.*

*34. The lighting apparatus of claim 1 wherein the light-emitting end directs light towards a surface to be illuminated.*

*35. The lighting apparatus of claim 34 wherein the means for supplying operating electric power includes a power selection circuit coupled to and selectively applying power to different numbers of the compact fluorescent lamps.*

*36. The lighting apparatus of claim 35 wherein the means for supplying operating electric power includes a plurality of remote ballasts, each ballast being coupled to at least one of the compact flourescent lamps.*

*37. An illumination system having a plurality of outwardly flared fixtures located a predetermined distance from a surface to be illuminated, and spaced apart in a predetermined grid pattern above the surface to be illuminated in which each of the fixtures has a base end of a first size and a light-emitting end of a second size larger than the first size, and having a center line extending from the center of the base end to the center of the light-emitting end thereof, the system including;*

*a plurality of linear light sources, each source including a perceptible light-generating portion that is at least twice as long as its width;*

*a plurality of supports, each located within a different one of the fixtures at the base end thereof configured to support the plurality of linear light sources angularly displaced about the center line within each of the fixtures between the base end and the light-emitting end thereof, each support including a plurality of support surfaces, each support surface configured to support the linear light sources so that the length of the light-generating portions extend outwardly at an angle from the center line toward the light-emitting end of the fixture to substantially parallel the fixture;*

*a power supply circuit coupled to and supplying operating electric power to linear light sources supported by the supports; and*

*the predetermined spacing between the fixtures being such that light emanating from the light-emitting end of each of the fixtures and received at a plurality of work plane heights, located from zero to at least four feet above the surface to be illuminated, overlaps light emitted from others of the fixtures in the pattern, beyond the next nearest fixture, in such a manner as to provide a substantially uniform distribution of light at and between each work plane height.*

*38. The system of claim 37 wherein each fixture includes a plurality of flutes configured to disperse light.*

*39. The system of claim 38 wherein the support surface of each fixture is configured to align the length of the light-generating portions of the linear light sources relative to the fixture and its fluting so that each of a plurality of points located along the fixture receives a plurality of light rays with various angles of incidence and emanating from along the length of the light-generating portions of the linear light sources, so that light rays are widely dispersed by the fixture in both vertical and horizontal components.*

*40. The system of claim 39 wherein the power supply circuit includes a power selection circuit coupled to and selectively applying power to different numbers of linear light sources supported by the support surfaces in each of the fixtures.*

*41. The system of claim 40 wherein the power supply circuit further includes a plurality of remote ballasts, each ballast being coupled to at least one associated linear light sources supported by the support surfaces.*

*42. The system of claim 41 wherein the plurality of ballasts are located external to each of the outwardly flared fixtures.*

*43. The system of claim 37 wherein the linear light sources are configured in each fixture so that each of a plurality of points located along the fixture receives a plurality of light rays with various angles of incidence and emanating from along the length of each linear light source.*

*44. The system of claim 49 wherein the linear light sources located within each of the fixtures are mounted on the support surfaces relative to the fixture such that the light rays emanating from the light-emitting end of the fixture collectively create a circle of light at a surface to be illuminated beneath the fixture, the circle of light having a diameter that is at least two times the distance between the light-emitting end of the fixture and the surface to be illuminated.*

* * * * *